United States Patent
Koenig

(10) Patent No.: US 9,630,488 B2
(45) Date of Patent: Apr. 25, 2017

(54) VEHICLE

(71) Applicant: Bayerische Motoren Werke Aktiengesellschaft, Munich (DE)

(72) Inventor: Roland Koenig, Habach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/959,410

(22) Filed: Dec. 4, 2015

(65) Prior Publication Data

US 2016/0082827 A1    Mar. 24, 2016

Related U.S. Application Data

(63) Continuation of application No. PCT/EP2014/060001, filed on May 15, 2014.

(30) Foreign Application Priority Data

Jun. 7, 2013   (DE) ................. 10 2013 210 705

(51) Int. Cl.
*B60K 7/00* (2006.01)
*B60G 3/20* (2006.01)
(Continued)

(52) U.S. Cl.
CPC .............. *B60K 7/0007* (2013.01); *B60G 3/20* (2013.01); *B62D 21/11* (2013.01); *B62D 29/041* (2013.01);
(Continued)

(58) Field of Classification Search
CPC .......... B60K 7/00; B60K 7/0007; B60G 3/20; B60G 3/202; B60G 3/205; B60G 3/207; B62D 21/11; B62D 29/041; B62D 35/02
(Continued)

(56) References Cited

U.S. PATENT DOCUMENTS 6,109,629 A    8/2000  Bortz et al.
2001/0022437 A1  9/2001  Suzuki
(Continued)

FOREIGN PATENT DOCUMENTS

DE    1 278 855      9/1968
DE    197 30 404 A1  1/1999
(Continued)

OTHER PUBLICATIONS

International Search Report (PCT/ISA/210) issued in PCT Application No. PCT/EP2014/060001 dated Jun. 23, 2014 with English translation (Six (6) pages).
(Continued)

*Primary Examiner* — John Walters
(74) *Attorney, Agent, or Firm* — Crowell & Moring LLP

(57) ABSTRACT

A vehicle has a body, a flat component arranged under the body, and at least one axle carrier arrangement for two front or two rear wheel suspensions. The axle carrier arrangement includes a left-hand suspension arm bracket for connecting at least one suspension arm of the left-hand wheel suspension, a right-hand suspension arm bracket for connecting at least one suspension arm of the right-hand wheel suspension, and a center suspension arm bracket for connecting at least one suspension arm of the lefthand wheel suspension and at least one suspension arm of the right-hand wheel suspension. The three suspension arm brackets are each mounted on the body and the flat component, wherein the three suspension arm brackets are three separate components that are not directly connected, and wherein at least one of the suspension arm brackets has a bearing for an electric machine that drives the vehicle.

20 Claims, 4 Drawing Sheets

(51) Int. Cl.
*B62D 21/11* (2006.01)
*B62D 29/04* (2006.01)
*B62D 35/02* (2006.01)
*B60K 1/00* (2006.01)

(52) U.S. Cl.
CPC ........ *B62D 35/02* (2013.01); *B60G 2200/184* (2013.01); *B60G 2204/15* (2013.01); *B60G 2204/18* (2013.01); *B60G 2204/182* (2013.01); *B60G 2300/50* (2013.01); *B60K 2001/001* (2013.01); *B60K 2007/0046* (2013.01)

(58) Field of Classification Search
USPC ............................ 180/55, 56, 57, 58, 60, 62
See application file for complete search history.

(56) References Cited

U.S. PATENT DOCUMENTS

| | | |
|---|---|---|
| 2007/0278778 A1 | 12/2007 | Tanaka et al. |
| 2010/0133773 A1 | 6/2010 | Buschjohann et al. |
| 2011/0068551 A1 | 3/2011 | Buschjohann et al. |
| 2013/0181485 A1* | 7/2013 | Rumpel ................. B60G 3/20 296/203.04 |
| 2013/0292932 A1 | 11/2013 | Stenzenberger et al. |

FOREIGN PATENT DOCUMENTS

| | | |
|---|---|---|
| DE | 101 63 220 A1 | 7/2003 |
| DE | 10 2005 017 031 A1 | 10/2006 |
| DE | 10 2006 013 554 A1 | 10/2007 |
| DE | 10 2007 063 303 A1 | 7/2008 |
| DE | 101 14 047 B4 | 10/2008 |
| DE | 10 2009 020 305 A1 | 12/2009 |
| DE | 10 2011 101 408 A1 | 5/2012 |
| DE | 10 2011 002 700 A1 | 7/2012 |
| DE | 10 2011 005 564 A1 | 10/2012 |
| DE | 10 2011 122 556 B3 | 11/2012 |
| DE | 10 2011 081 836 A1 | 2/2013 |
| EP | 1 690 779 A1 | 8/2006 |
| WO | WO 2007/028372 A1 | 3/2007 |

OTHER PUBLICATIONS

German-language Search Report issued in counterpart German Application No. 10 2013 210 705.6 dated Jan. 7, 2014 with partial English translation (Ten (10) pages).

\* cited by examiner

VEHICLE

CROSS REFERENCE TO RELATED APPLICATIONS

This application is a continuation of PCT International Application No. PCT/EP2014/060001, filed May 15, 2014, which claims priority under 35 U.S.C. §119 from German Patent Application No. 10 2013 210 705.6, filed Jun. 7, 2013, the entire disclosures of which are herein expressly incorporated by reference.

BACKGROUND AND SUMMARY OF THE INVENTION

The present invention relates to a vehicle, more particularly to the design of an axle carrier of the vehicle. The vehicle is more particularly designed as a motor vehicle with four wheels.

German patent document DE 10 2005 017 031 A1 discloses, by way of example, an axle carrier according to the prior art. Normally axle carriers, more particularly rear axle carriers, are designed completely self-supporting and are connected to the vehicle via several rubber bearings. This serves primarily for the acoustic decoupling of the rear axle transmission in the case of vehicles driven by combustion engines. Both the body and also the axle carrier must thereby be designed completely self-supporting in order to be sufficiently rigid and operationally reliable in spite of the rubber elements which connect them together. This requires corresponding weight.

It is the object of the present invention to provide a vehicle which with a cost-effective construction and a low-maintenance operation is to have the lightest weight possible and at the same time sufficient fatigue strength.

This and other objects are achieved by a vehicle, more particularly a motor vehicle, comprising a body, a flat component arranged under the body, and at least one axle carrier arrangement. The axle carrier arrangement is provided either for the two front or the two rear wheel suspensions. The axle carrier arrangement is, more particularly, designed for the rear axle. The axle carrier arrangement comprises a left-hand and a right-hand suspension arm bracket. The two suspension arm brackets each serve for connecting at least one suspension arm of one wheel suspension. One wheel each can be mounted on each left-hand and right-hand wheel suspension. According to the invention, the two suspension arm brackets are each fastened on the body and on the flat component. The two suspension arm brackets are correspondingly situated between the body and the flat component. Furthermore, a center suspension arm bracket is provided. The center suspension arm bracket is also called a cross structure. In particular, the center suspension arm bracket is located, seen in the driving direction, behind the left-hand and right-hand suspension arm bracket. The center suspension arm bracket serves to connect at least one suspension arm of the left-hand wheel suspension and at least one suspension arm of the right-hand wheel suspension. The center suspension arm bracket is also fixed on the body and on the flat component and is thus situated between the body and the flat component. The three suspension arm brackets, thus the left-hand suspension arm bracket, the right-hand suspension arm bracket and the center suspension arm bracket, are three separate component parts which are not directly connected. The three suspension arm brackets taken by themselves do not form a supporting structure. Only the connection of the three suspension arm brackets to the body and to the flat component leads to a supporting structure on which the wheel suspensions can be connected by way of the suspension arms. No cross support is provided between the left-hand and right-hand suspension arm bracket. An indirect connection of the suspension arm brackets is only achieved by the body and by the flat component.

According to the invention, at least one of the suspension arm brackets includes a bearing for an electric machine driving the vehicle. More particularly, each of the three suspension arm brackets has one bearing each so that the electric machine is accommodated at three points between the three suspension arm brackets. A decisive advantage of the invention is that a relatively large structural space remains between the three suspension arm brackets. A corresponding electric machine, even with transmission and differential, can be easily arranged in this structural space. The vehicle is accordingly preferably designed as a hybrid vehicle or electric vehicle.

According to the invention there is no separate self-supporting structure such as, by way of example, a body and a self-supporting rear axle carrier. Within the scope of the invention it was recognized that no self-supporting axle carrier is necessary if a corresponding flat component is bound into the complete supporting structure. A considerable weight and cost saving is thereby achieved for the vehicle.

Advantageous developments of the suspension arm brackets are described below. The development is thereby provided in each case for at least one of the three suspension arm brackets.

It is preferred that at least one of the suspension arm brackets is connected rigidly to the body. It is furthermore preferred that at least one of the suspension arm brackets is connected rigidly to the flat component. The rigid connection is thereby preferably undertaken by screws. More particularly, rubber-elastic bearings are omitted for the rigid connection. By using correspondingly good rubber bearings between the suspension arms and the suspension arm brackets, the suspension arm brackets can be rigidly connected to the flat component and/or to the body.

The flat component is preferably designed to be structurally reinforcing. This means that the axle carrier arrangement is only load-bearing by fastening the suspension arm brackets on the flat component and on the body. The entire structure is thus only load-bearing by screwing the individual components to one another and to the body.

The flat component is preferably designed as an underbody. More particularly, this underbody forms a lower aerodynamic closure of the vehicle. The flat component is thus not only a shear panel, but also serves at the same time as an underbody, more particularly for improving the aerodynamics of the vehicle. According to the invention the flat component is required in order to form together with the suspension arm brackets and the body, one supporting structure. Therefore, an operation of the vehicle without the flat component, more particularly without the underbody, is not possible. The formation of the underbody as an aerodynamic closure of the vehicle enables an energy-efficient operation of the vehicle, and thus more particularly an extended range. In the prior art the axle suspension is movable relative to the body through a rubber-elastic connection. Therefore in the prior art fixing a closed underbody, which is secured to the vehicle, on the axle carrier is not possible without further measures. According to the invention this is however possible since the suspension arm brackets and thus also the flat component are connectable rigidly to the body.

It is preferred if the flat component is connected non-destructively releasably to all three suspension arm brackets. The non-destructively releasable connection is achieved more particularly by screw fastenings. Thus, in particular, the flat component designed as the underbody can be dismantled and reassembled again with minimum effort for maintenance purposes. More particularly when arranging a motor preferably an electric motor between the suspension arm brackets, the motor is directly accessible by dismantling the underbody.

It is furthermore preferred that the body is connected, preferably screwed, in a non-destructive releasable manner to all three suspension arm brackets. A simple mounting and dismantling is provided by this releasable connection. Furthermore, different materials can be connected to one another without problem by the screw fitting.

The flat component, more particularly designed as an underbody, is preferably connected, preferably screwed, in a non-destructive releasable manner to the body at at least one body attachment point. In order to design the dismantling capability and thus the accessibility to the motor as best as possible, the underbody should also be non-destructively releasable from the body.

The flat component, more particularly designed as an underbody, is preferably so large that it engages partially round the wheels. Recesses are provided accordingly in the flat component for the wheels of the vehicle.

The flat component is more particularly not only a small shear panel within the axle carrier, but also preferably extends over at least 10%, preferably at least over 20%, more particularly preferably at least over 30%, of the surface area of a vertical projection of the vehicle.

The flat component is preferably made up of a plate element and a reinforcement structure reinforcing the plate element. The reinforcement structure is set on the plate element or is integrated in the plate element. More particularly, the plate element is formed thicker in some places wherein the thick portions form the reinforcement structure.

Particularly preferred is for the plate element to be a sandwich structure. Through different thickness core material, e.g. foam or honeycomb structure, the reinforcement structure can be integrated directly into the plate element.

More particularly, the complete flat component has a maximum thickness of 150 mm, preferably 50 mm, more particularly preferred 20 mm, so that sufficient structural space is provided above the flat component and sufficient ground clearance is provided underneath the flat component.

The center suspension arm bracket is preferably connected at two connection points to the flat component and to two body attachment points to the body, wherein the center suspension arm bracket is configured at least approximately free of bending moment relative to these four force introduction points (two connection points and two body attachment points). The configuration free of bending moment applies in the first instance for forces perpendicular to the longitudinal direction of the vehicle. This is preferably achieved as follows: two imaginary lines (secondary lines) each run, corresponding to the force paths, through a body attachment point and the diagonally opposite connection point. Material of the center suspension arm bracket is provided along these two lines, i.e. there are no, or only slight, recesses provided on these lines. For an at least approximately bending-moment-free configuration it is preferably proposed that material is provided over at least 50%, preferably at least 60%, of the overall length of these lines. It is furthermore proposed that material is provided at the intersection point of the two lines.

The different component parts of the envisaged vehicle can be made from metal. Alternatively it is proposed advantageously to manufacture at least one of the suspension arm brackets and/or the flat component from a pressed composite material or a fiber-composite material. More particularly fiber-reinforced plastic is used as the fiber-composite material. Furthermore it is proposed to combine the fiber-composite materials and the pressed composite materials with one another.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
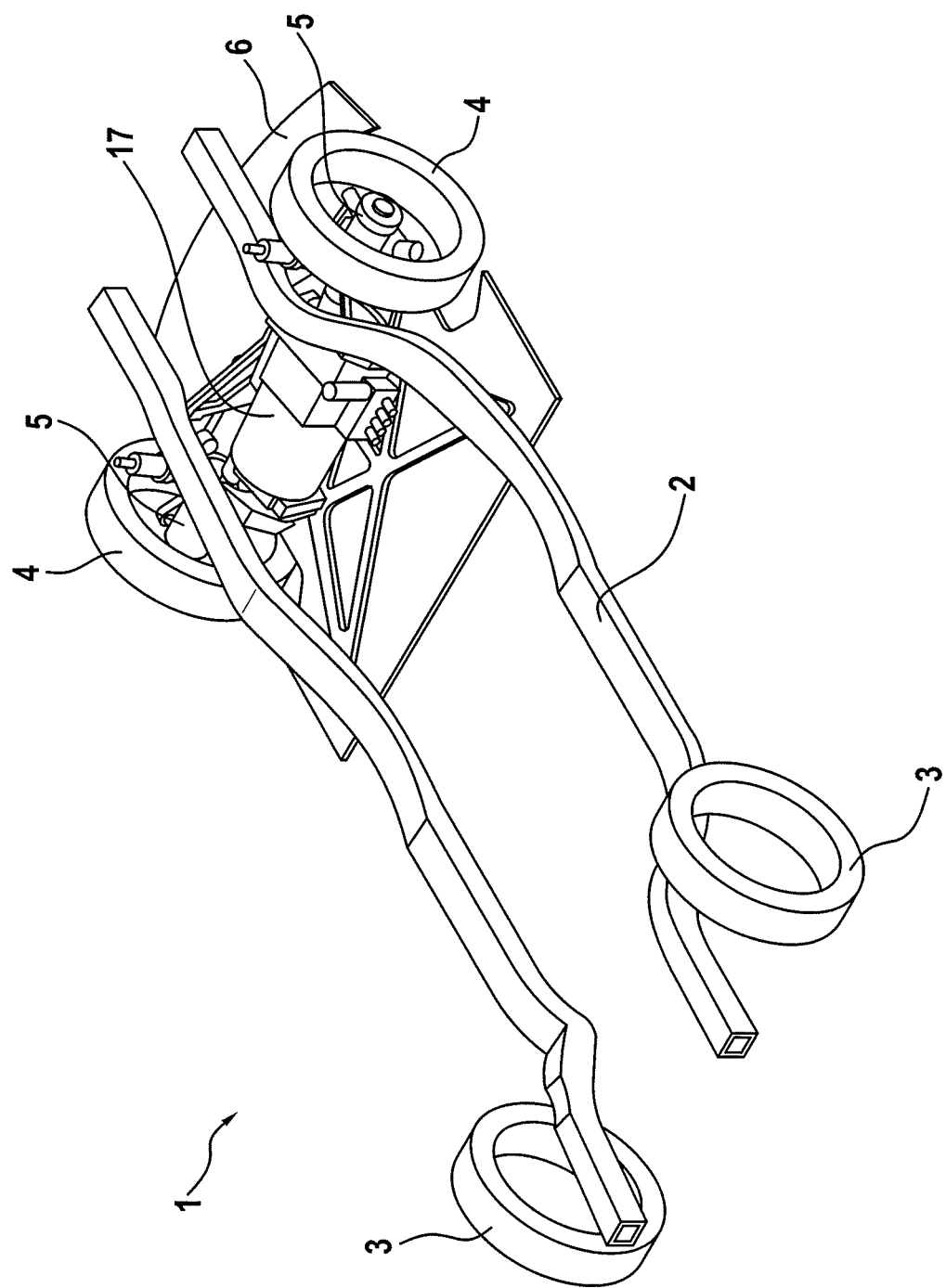
FIG. 1 is a diagrammatically simplified view of a vehicle according to an embodiment of the invention.

FIG. 1 shows a vehicle 1. A body 2, two front wheels 3 and two rear wheels 4 are shown purely diagrammatically and in simplified form. The rear wheels 4 are located on an axle carrier arrangement 5. The vehicle 1 furthermore includes a flat component 6, formed as an underbody. The underbody forms an aerodynamically optimized lower closure of the vehicle 1.

Figure 2:
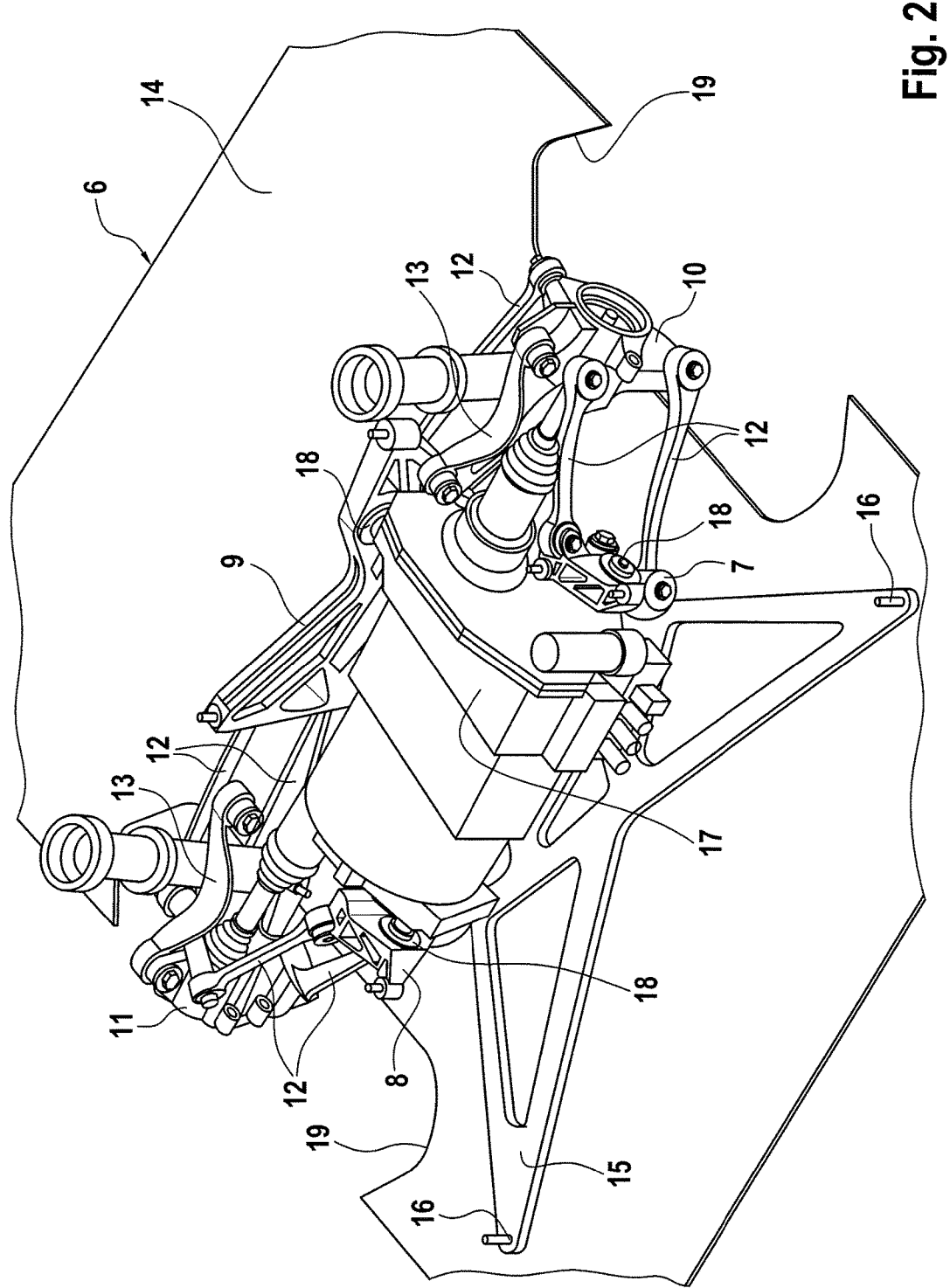
FIG. 2 is a first detail of the vehicle according to the embodiment of the invention.

FIG. 2 shows in detail a rear section of the vehicle 1. A left-hand suspension arm bracket 7, a right-hand suspension arm bracket 8 and a center suspension arm bracket 9 can be seen. The three suspension arm brackets 7, 8, 9 form the axle carrier arrangement 5. The three suspension arm brackets 7, 8 9 are individual component parts which are not directly connected to one another. More particularly, the included component parts 7, 8, 9 are made of pressure cast aluminium or fiber-reinforced plastics.

FIG. 2 furthermore shows a left-hand wheel suspension 10 and a right-hand wheel suspension 11. The two wheel suspensions 10, 11 serve to mount the two rear wheels 4 (not shown in FIG. 2).

The left-hand wheel suspension 10 is connected by suspension arms 12 to the left-hand suspension arm bracket 7 and to the center suspension arm bracket 9. The right-hand wheel suspension 11 is connected by suspension arms 12 to the right-hand suspension arm bracket 8 and to the center suspension arm bracket 9.

Furthermore, the two wheel suspensions 10, 11 have further suspension arms 13 which connect the wheel suspensions 10, 11 directly to the body.

FIG. 2 furthermore shows a section of the flat component 6 which is designed as an underbody. The flat component 6 is made up of at least one plate element 14 and one reinforcement structure 15. Both the plate element 14 and also the reinforcement structure 15 extend practically in a horizontal plane. The flat component 6 has only a very small thickness in the plane perpendicular thereto. The flat component 6 can also be designed slightly curved or in complex geometry—according to the aerodynamic requirements.

Recesses 19 are preferably provided on both sides in the plate element 14. The recesses 19 engage partially round the rear wheels 4. The flat component 6 thereby forms an aerodynamically optimized cover of the vehicle 1 in the lower region.

FIG. 2 furthermore shows an electric machine 17 which is arranged between the three suspension arm brackets 7, 8, 9. Each of the suspension arm brackets 7, 8, 9 has a bearing 18. The electric machine 17 is fastened at three points by way of these bearings 18.

Figure 3:
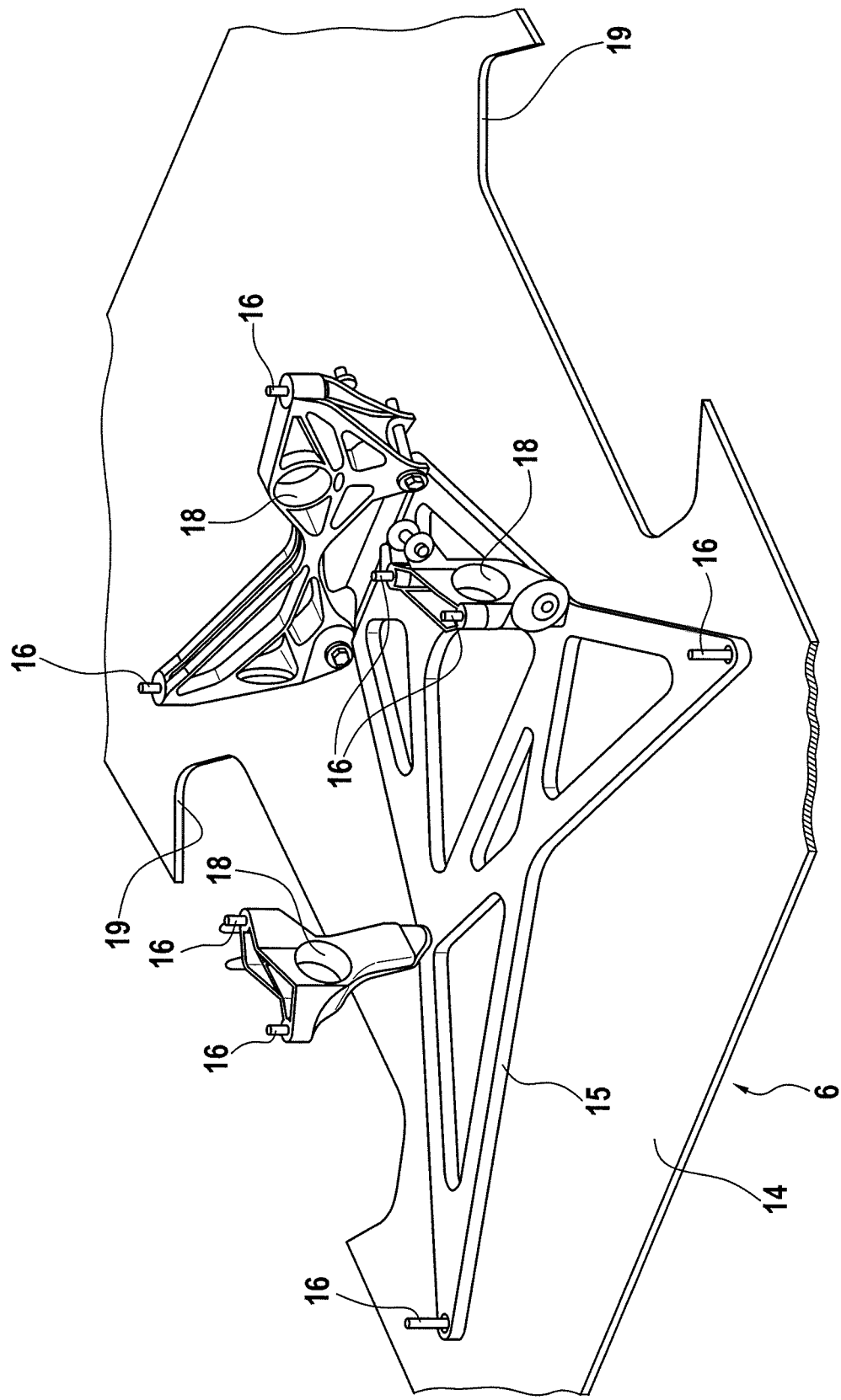
FIG. 3 is a second detail of the vehicle according to the embodiment of the invention.

FIG. 3 shows the same detail as FIG. 2, wherein in FIG. 3 for clarity the electric machine 17 and the two wheel suspensions 10, 11 are omitted. Body attachment points 16 are marked more particularly in FIG. 3. The three suspension arm brackets 7, 8, 9 and the flat component 6, more particularly the reinforcement structure 15, are connected via these body attachment points 16 directly to the body 2.

The body attachment points 16 are formed as screw fittings. These are more particularly rigid screw fittings without rubber bearings.

The axle carrier arrangement 5 according to the invention with the three suspension arm brackets 7, 8, 9 taken by themselves do not represent a fixed supporting structure, since the three suspension arm brackets 7, 8, 9 represent individual component parts. Only the screw connection both with the flat component 6 and with the body 2 results in a supporting structure on which the two wheel suspension 10, 11 can be mounted. This structural concept has no duplications. Only the overall connected unit is in a position to deal with the operating loads which occur. Since a major part of the loads is processed via the flat component 6, which is designed as a shear panel and underbody, the three suspension arm brackets 7, 8, 9 can be designed with a very light construction.

The flat component 6, which is designed as an underbody and shear panel, is rigidly screwed to the rest of the vehicle 1 and thus enables an aerodynamically optimum configuration in order to noticeably reduce the air resistance value of the vehicle 1.

The reduction in the bending parts in the supporting structure helps to minimize the structural space. It is thereby possible, in particular, to arrange the electric machine 17, even with the transmission and differential, between the suspension arm brackets 7, 8, 9.

Figure 4:
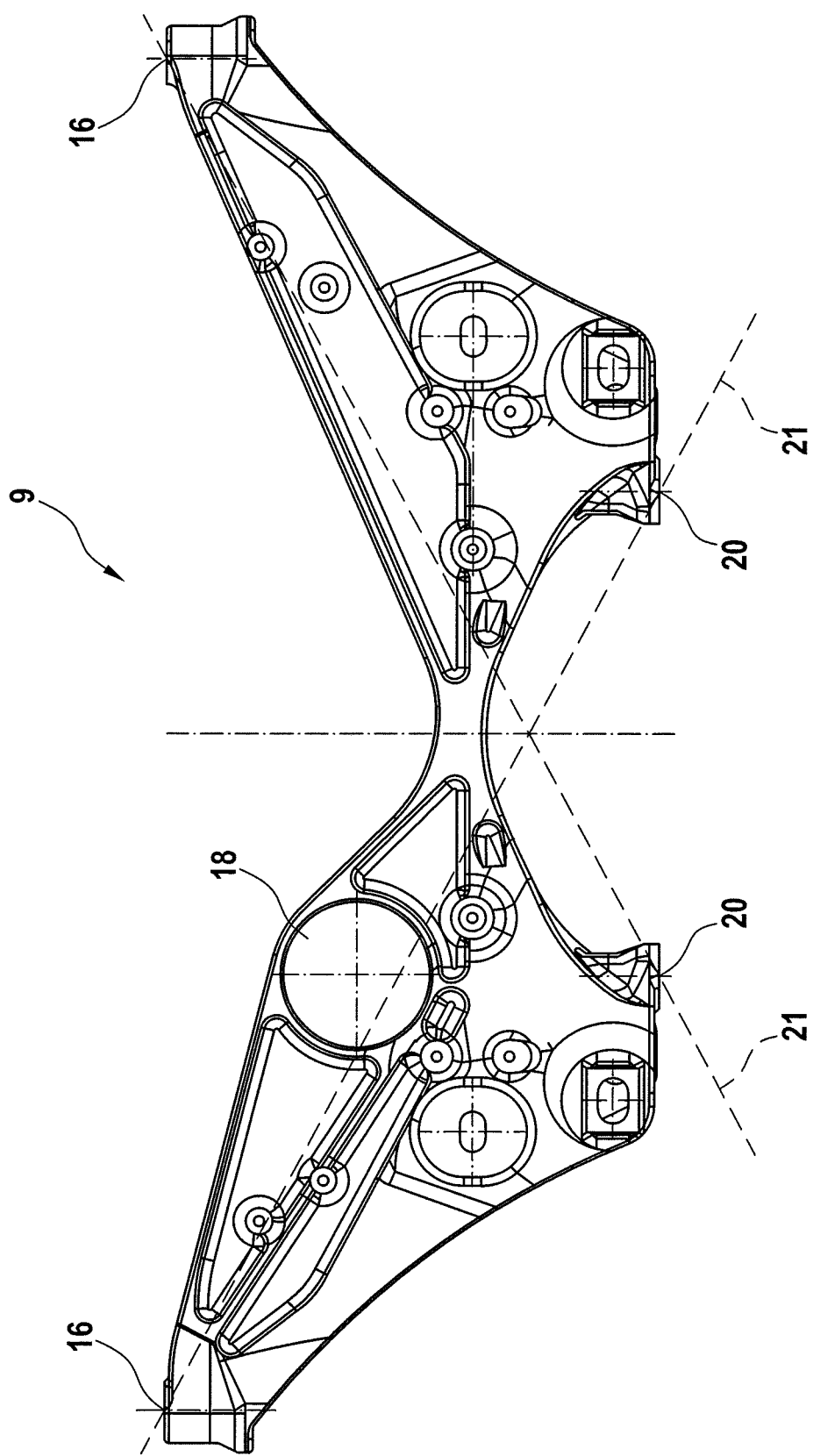
FIG. 4 is a center suspension arm bracket of the vehicle according to the embodiment of the invention.

FIG. 4 shows the center suspension arm bracket 9 in detail. The center suspension arm bracket 9 is screwed to the body 2 via the two body attachment points 16. The center suspension arm bracket 9 is connected to the flat component 6 via two connection points 20. A secondary line 21 runs from each body attachment point 16 to the opposite connection point 20. For a bending-moment-free configuration of the center suspension arm bracket 9 material is provided along the major part of the overall length of the two secondary lines 21. The center suspension arm bracket 9 is for this preferably made in one piece. The center suspension arm bracket 9 is recessed along a secondary line 21 at the bearing 18 for the electric machine 17.

LIST OF REFERENCE NUMERALS

1 Vehicle
2 Body
3 Front wheels
4 Rear wheels
5 Axle carrier arrangement
6 Flat component, more particularly underbody
7 Left-hand suspension arm bracket
8 Right-hand suspension arm bracket
9 Center suspension arm bracket
10 Left-hand wheel suspension
11 Right-hand wheel suspension
12 Suspension arm
13 Further suspension arm
14 Plate element
15 Reinforcement structure
16 Body attachment points
17 Electric machine
18 Bearing
19 Recesses
20 Connection points
21 Secondary lines The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a body;
   a flat component mounted underneath the body; and
   at least one axle carrier arrangement for two front or two rear wheel suspensions, the axle carrier arrangement comprising three suspension arm brackets which are:
   a left-hand suspension arm bracket for attaching at least one suspension arm of a left-hand wheel suspension,
   a right-hand suspension arm bracket for attaching at least one suspension arm of a right-hand wheel suspension, and
   a center suspension arm bracket for attaching at least one suspension arm of the left-hand wheel suspension and at least one suspension arm of the right-hand wheel suspension,
   wherein the three suspension arm brackets are each fastened on the body and on the flat component,
   wherein the three suspension arm brackets are three separate component parts not connected directly, and
   wherein at least one of three suspension arm brackets comprises a bearing for an electric machine driving the vehicle.

2. The vehicle according to claim 1, wherein all three suspension arm brackets comprise a bearing for the electric machine driving the vehicle.

3. The vehicle according to claim 1, wherein at least one of the three suspension arm brackets is connected to the body rigidly.

4. The vehicle according to claim 3, wherein at least one of the suspension arm brackets is connected to the flat component rigidly.

5. The vehicle according to claim 4, wherein the flat component is connected in a non-destructive releasable manner to all three suspension arm brackets.

6. The vehicle according to claim 5, wherein the body is connected in a non-destructive releasable manner to all three suspension arm brackets.

7. The vehicle according to claim 6, wherein the flat component is connected in a non-destructive releasable manner to the body at at least one body attachment point.

8. The vehicle according to claim 7, wherein the flat component is formed as a structural reinforcement so that the axle carrier arrangement is only load-bearing by fixing the three suspension arm brackets on the flat component and on the body.

9. The vehicle according to claim 4, wherein the at least one suspension arm bracket connected to the body rigidly and the at least one suspension arm bracket connected to the flat component rigidly have a screw connection without any elastic bearing.

10. The vehicle according to claim 1, wherein the flat component is formed as a structural reinforcement so that the axle carrier arrangement is only load-bearing by fixing the three suspension arm brackets on the flat component and on the body.

11. The vehicle according to claim 1, wherein the flat component is formed as an underbody of the vehicle.

12. The vehicle according to claim 11, wherein the flat component formed as the underbody is designed as a lower aerodynamic closure of the vehicle.

13. The vehicle according to claim 1, wherein the flat component has, on each side, a recess for a wheel of the vehicle.

14. The vehicle according to claim 1, wherein the flat component extends at least over 10% of a perpendicular area projection of the vehicle.

15. The vehicle according to claim 1, wherein the flat component extends at least over 20% of a perpendicular area projection of the vehicle.

16. The vehicle according to claim 1, wherein the flat component extends at least over 30% of a perpendicular area projection of the vehicle.

17. The vehicle according to claim 1, wherein the flat component has a maximum thickness of 150 mm.

18. The vehicle according to claim 1, wherein the flat component has a maximum thickness of 20 mm.

19. The vehicle according to claim 1, wherein the flat component comprises a plate element and a reinforcement structure fitted on the plate element and/or integrated in the plate element.

20. The vehicle according to claim 1, wherein at least one of the three suspension arm brackets and/or the flat component is made from pressed composite material or fiber-composite material.

* * * * *